April 21, 1970

M. J. BOYAJIAN

3,507,350

VEHICLE DIRECTIONAL SWITCH AND SEAT SWITCH INTERLOCK

Filed Nov. 24, 1967

Inventor
Myron J. Boyajian

By Charles E. Schurr
Attorney

United States Patent Office 3,507,350
Patented Apr. 21, 1970

3,507,350
VEHICLE DIRECTIONAL SWITCH AND
SEAT SWITCH INTERLOCK
Myron J. Boyajian, Chicago, Ill., assignor to Allis-Chalmers Manufacturing Company, Milwaukee, Wis.
Filed Nov. 24, 1967, Ser. No. 685,679
Int. Cl. B60l 3/02
U.S. Cl. 180—101                                   4 Claims

ABSTRACT OF THE DISCLOSURE

An automatic safety control for a vehicle whereby if the operator leaves the vehicle while in either a forward or a reverse drive condition, the drive will be interrupted and on return of the operator to his operating station, a memory circuit prevents drive from being reestablished unless a manual control is operated.

---

This invention relates to an improved safety control for a vehicle wherein the drive power to the traction means is interrupted upon the operator leaving his operating station and wherein the control prevents unintentional movement of the vehicle upon the return of the operator to his operating station.

Heretofore others have suggested means for interrupting the drive to the traction means of a vehicle upon the operator leaving his station. In some such controls the power is automatically interrupted without necessity of moving the manual control for the vehicle drive to its neutral position. Thus the operator may leave the vehicle without shifting the drive control to neutral and upon his return to the operator's station the drive will automatically be reestablished. This creates a very dangerous situation because the operator may have forgotten that the drive control was left in a drive establishing position and the unexpected movement of the truck may result in injury to goods and personnel.

It is an object of this invention to provide a safety control for a vehicle with a seat operated power disconnect wherein the vehicle drive will not be established upon the operator's return to the seat unless the operator moves a manual control.

It is a further object of this invention to provide a memory circuit in a seat operated drive disconnect for an electric lift truck which prevents automatic movement of the truck upon the operator being reseated after having left the truck with the drive control in a drive establishing position.

It is a further object of this invention to provide a safety system of the hereinbefore outlined character which requires a minimum of power, is relatively inexpensive and may readily be incorporated into lift trucks of current design.

It is a further object of this invention to provide a circuit controlling the forward and reverse switches for the drive motor which has seat operated means to inactivate the circuit when the seat is unoccupied and wherein once the circuit is inactivated by operation of the seat the motor cannot be operated unless the forward-reverse control for the forward and reverse switches is first placed in or occupies its neutral position.

Figure 1:
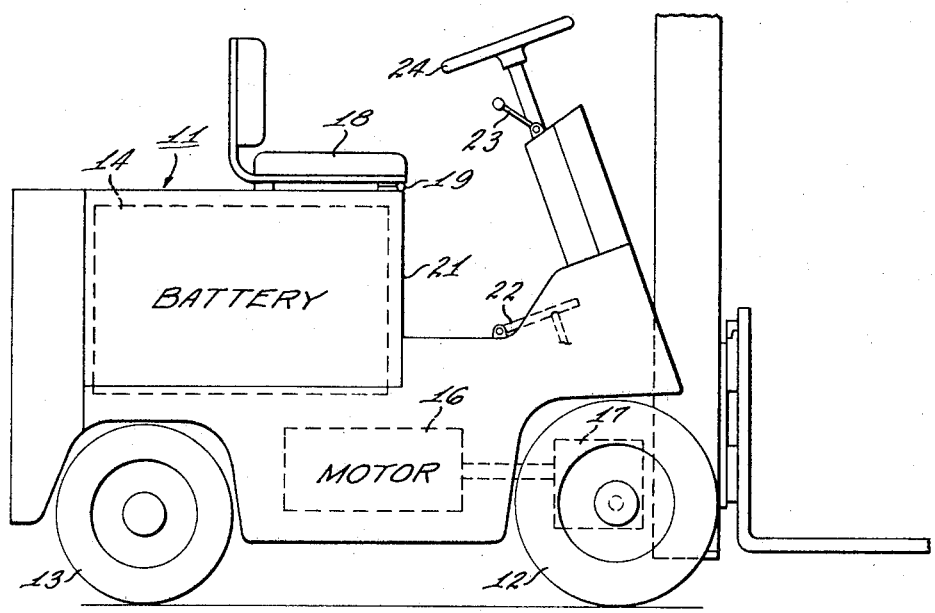
Figure 2:
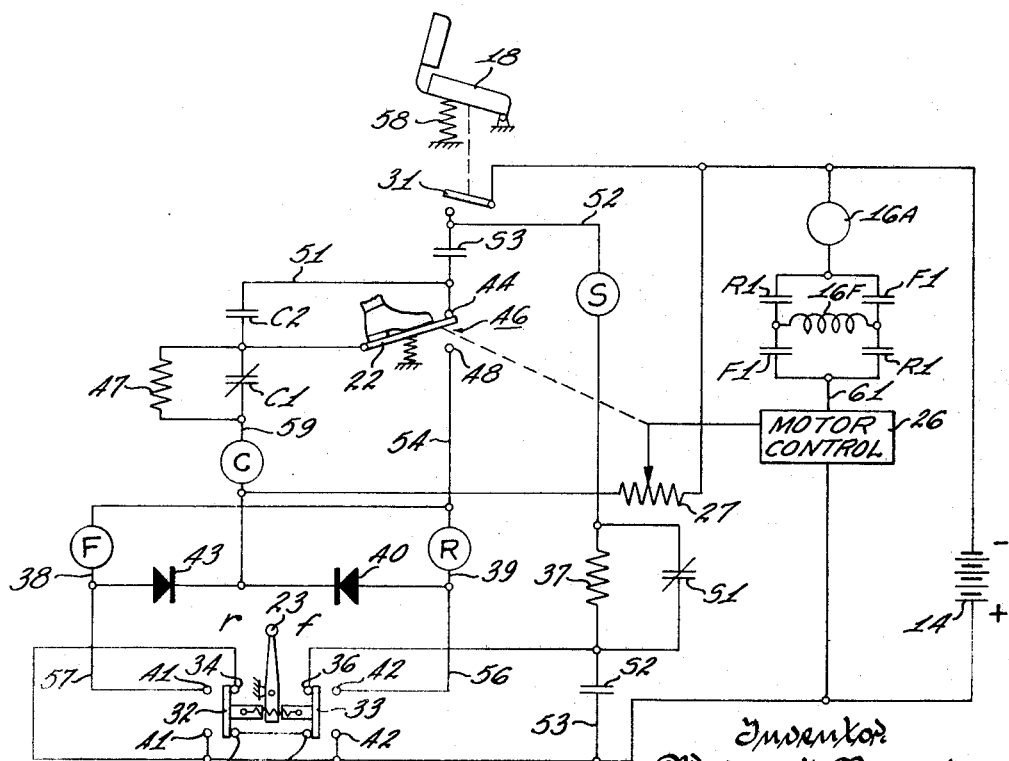

These and other objects and advantages of this invention will be apparent to those familiar with the lift truck safety controls upon reading the following description in conjunction with the drawings in which:

FIG. 1 is a side view of an electric lift truck with which the present invention is embodied; and FIG. 2 is a schematic view of an electric circuit for the lift truck of FIG. 1 and incorporating the present invention.

The safety system of the present invention, though applicable to various vehicles, will be described as it relates to an electric lift truck 11 illustrated in FIG. 1. The vehicle or truck 11 includes a pair of front drive wheels 12 and a pair of rear steerable wheels 13. The power source for operating the vehicle 11 is an electric battery 14 which supplies power to a motor 16 under control of the operator and is connected in driving relation to the drive wheels 12 through mechanical drive means 17. The operator's station includes a seat 18 pivotally connected by a hinge 19 to the lift truck chassis 21. Also provided at the operator's station are suitable manual controls such as an accelerator pedal 22, forward-reverse control lever 23, and steering wheel 24.

Referring to FIG. 2, the drive motor 16 includes an armature winding 16A, a series field winding 16F and forward and reverse contactors or switches F1 and R1 for controlling direction of motor operation. Power to the motor is controlled by a pulse width modulation control 26 which in turn is controlled by a signal from a manually operated speed control means including foot pedal 22 and a potentiometer 27 to which it is connected. The switches F1 and R1 are closed by energization of the solenoids F and R, respectively.

When it is desired to operate the vehicle 11, the driver occupies seat 18 thereby closing seat switch 31. If the direction control lever 23 is in neutral, as illustrated, contacts 32 and 33 will bridge terminals 34, 36 and there will be a current path from the positive side of battery 14 through normally closed switch S1, relay coil S and switch 31 to the negative side of battery 14. Relay coil S will be energized, closing normally open switch S2 and opening switch S1. The circuit for relay coil S is now made through direction switch 23, switch S2 and economizing resistor 37. Also, when coil S is energized, normally open switch S3 closes and furnishes an electric path to the negative side of battery 14 through seat switch 31 for the direction control circuits 38, 39 as will next be explained.

If the vehicle operator now moves the direction control lever 23 to its forward position F, contactor 32 bridges contacts 41 and current will flow from the positive side of battery 14 through diode 43 to relay or coil C, through normally closed switch C1, through closed contact 44 of accelerator foot switch 46 and through the closed switches S3 and 31 to the negative side of the power source. Current flow for relay C is now through the economizing resistor 47. To drive the vehicle, the operator depresses the accelerator pedal, which, upon initial depression, breaks contact with contact 44 and makes contact with contact 48. The current path for coil C is now through its holding circuit 51 which is in bypassing relation to accelerator switch 46. There is also a current path through the closed forward switch 41, 32 through the forward direction contactor relay F, through foot switch 46, through switch C2, through the switch S3 and seat switch 31. Coil F closes the motor power circuit switches F1 and the truck will proceed in the forward direction, accelerating as the accelerator 22 is further depressed to operate the potentiometer 27. In this condition the seat operated safety circuit 52 is energized through the closed holding circuit 53 for relay S.

If, while traveling in either a forward or reverse direction, the operator should allow the manual control element 22 to return to its illustrated stop position, the operating circuit 54 for the direction switch relays F and R will be interrupted.

If the operator should place the manually operated switches 32, 33 in their neutral positions, as illustrated, while the speed control element 22 is depressed to a speed selecting position, the relay operating circuit 54 will be interrupted by disconnects in both its branches 56, 57 thereby deenergizing whichever of the coils F and R were previously energized. Thus, the power to the drive motor 16 will be disconnected even though the accelerator pedal 22 is depressed to a speed selecting position.

If the operator should leave his station, that is leave seat 18, the seat will move upwardly to its raised unoccupied position shown in FIG. 2 under the influenece of compression spring 58, thereby opening seat operated switch 31 in the safety circuit 52. Since switch 31 is also common to relay operating circuit 54 and the speed control circuit 59 all circuits will be deenergized upon opening of seat operated switch 31. It will also be noted that the holding circuits 51, 53 for relays C and S will be deenergized through opening of switches C2 and S2. Let us assume that the operator left the vehicle with the manual drive control lever 23 in a forward position. On returning to the seat, switch 31 will be closed, however safety circuit 52, which acts as a memory circuit, will be interrupted since contacts 34 will not be bridged and since normally open switch S2 will be open. The operator must return the manual drive control switches to their illustrated neutral position to close switch S3, thus permitting energization of the power circuit 61 upon subsequent movement of the direction control 23 to a drive establishing position, as indicated by the letters r and f. In other words the motor switch must be moved from its neutral position to a power on position before the vehicle can be operated on return of the operator.

If when leaving the seat, the operator had placed the control lever 23 in its neutral position, the seat switch circuit 52 would have immediately become energized on closing of seat switch 31. To drive the vehicle it would then merely be necessary to place the lever 23 in forward or reverse and depress the accelerator slightly to close contact 48.

From the foregoing description and the drawings it is apparent that I have provided a novel and useful safety system for a lift truck. My invention is particularly useful in the control means for a vehicle having an electric drive motor 16 controlled by power circuit means 61 including manually controlled motor switches R1, F1 which are selectively placed in their power off and power on positions by relays R and F. In my invention I employ a special memory circuit 52 which includes a seat operated switch 31 and a relay S for inactivating the power circuit 61 by opening switch S3. The memory or safety circuit includes direction circuit interlocking means in the form of a switch operated by the direction control switch mechanism 23, 32, 33 and also includes a holding circuit 53 with relay operated switch S2. I also provide a speed control circuit 59 which can be initially energized only when the direction switch is in forward or reverse and the accelerator 22 is in its illustrated stop position, wherein the holding circuit 51 is established by the relay C closing switch C2. Current flow through the relay C will be by way of either diode 43 or 40 depending on which of the contacts 41, 42 are bridged. My safety system is relatively inexpensive and is readily installable on existing lift trucks as well as current production trucks. This safety system effectively prevents unexpected movement of the lift truck on return of the operator to the operating station. The operator on return to the seat 18 must move manual control member before the truck will move under power.

The embodiments of the invention in which an exclusive property or privilege is claimed are defined as follows:

1. In control means for a vehicle having an electric drive motor and an operator's seat mounted on the vehicle for movement between an occupied position and a raised unoccupied position, the improvement comprising:
   power circuit means for said motor including
      a motor switch,
      a first relay for operating said motor switch,
      an operating circuit for said first relay including
         a manually operated switch having drive and neutral positions, and
         a second switch in series with said manually operated switch, and
   a safety circuit inactivating said power circuit means upon said seat moving to its unoccupied position and preventing activation of said power circuit means upon said seat being occupied unless said manually operated switch is sequentially moved from its neutral position to its drive position, said safety circuit including
      a seat operated switch,
      a second relay for operating said second switch,
      switch means operated by said manually operated switch whereby, when said seat is occupied and said manually operated switch is in its neutral position, said second relay will close said second switch and whereby, when said seat is occupied and said manually operated switch is in its drive position, said safety circuit will not be energized and said second switch will be open, and
      a holding circuit for said second relay whereby once energized it will become deenergized only on opening of said seat operated switch.

2. The invention of claim 1 and further comprising speed regulating means including a manual control element having stop and speed selecting positions and switch means operated by said manual control element operative to interrupt said relay operating circuit upon said manual control element being in its stop position.

3. The invention of claim 2 and further comprising a speed control circuit including a third relay and a manual control element operated switch permitting energization of said speed control circuit upon said manual control element being in its stop position and a holding circuit for said third relay bypassing said manual control element operated switch including a switch operated by said third relay.

4. In control means for a vehicle having an electric drive motor controlled through forward and reverse relays, a motor operating circuit including parallel connected relay circuits and a manually operated direction switch in the relay circuits having forward, reverse and neutral positions and an operator's seat mounted on the vehicle for movement between an occupied position and a raised unoccupied position, the improvement comprising:
   a seat operated switch in said operating circuit having open and closed positions,
   means moving said seat operated switch to its open position when said seat is moved upwardly to its unoccupied position, and
   a safety circuit for preventing energization of said forward and reverse relays in event said seat operated switch is moved from its open position to its closed position when said direction switch is in one of its forward and reverse positions and permitting energization of said relays when said seat operated switch is closed only upon said direction switch being moved from its neutral position to one of its forward and reverse positions, said safety circuit including a relay with a normally open switch in said operating circuit in series relation to said seat switch and a switch controlled by the position of said manually operated direction switch whereby said last mentioned relay will be energized to close said normally open switch only when said direction switch is in its neutral position.

References Cited

UNITED STATES PATENTS

| 2,606,626 | 8/1952 | Meyer | 180—101 |
| 2,751,994 | 6/1956 | Remde | 180—100 |
| 2,807,729 | 9/1957 | Redick. | |
| 2,911,053 | 11/1959 | Ayers et al. | 180—101 |
| 3,356,173 | 12/1967 | Holcombe | 180—65 |
| 3,414,074 | 12/1968 | Dannettell | 180—101 |

KENNETH H. BETTS, Primary Examiner

U.S. Cl. X.R.

180—65